US007058240B2

(12) United States Patent
Albertelli et al.

(10) Patent No.: US 7,058,240 B2
(45) Date of Patent: Jun. 6, 2006

(54) ADAPTIVE SYSTEM AND METHOD FOR PATTERN CLASSIFICATION

(75) Inventors: Lawrence E. Albertelli, Owego, NY (US); Charles Call, Owego, NY (US); David L. Ii, Owego, NY (US); Nina Kung, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 729 days.

(21) Appl. No.: 10/274,028

(22) Filed: Oct. 18, 2002

(65) Prior Publication Data

US 2004/0076344 A1    Apr. 22, 2004

(51) Int. Cl.
*G06K 9/60* (2006.01)

(52) U.S. Cl. .................. 382/305; 382/219; 382/224; 707/6

(58) Field of Classification Search ............ 382/219, 382/224, 227, 278; 707/6, 7
See application file for complete search history.

(56) References Cited

U.S. PATENT DOCUMENTS

| | | | |
|---|---|---|---|
| 4,837,842 A | 6/1989 | Holt | 382/26 |
| 5,386,482 A | 1/1995 | Basso et al. | 382/9 |
| 5,487,117 A | 1/1996 | Burges et al. | 382/173 |
| 5,727,081 A | 3/1998 | Burges et al. | 382/229 |
| 6,014,450 A | 1/2000 | Heilper et al. | 382/101 |
| 6,021,220 A | 2/2000 | Anderholm | 382/194 |

OTHER PUBLICATIONS

Belaïd, A. (n.d.) *OCR: Print—An overview.* Unpublished article, Centre de Recherche en Informatique de Nancy, Nancy, France.
Park, J. (1999) *Hierarchical Character Recognition and Its Use in Handwritten Word/Phrase Recognition.* Unpublished doctorate dissertation, State University of New York at Buffalo, Buffalo, New York.
Holmström, L., Koistinen, P., Laaksonen, J. & Oja, E. (1996) *Comparison of Neural and Statistical Classifiers—Theory and Practice.* Research Reports A13. Rolf Nevanlinna Institute, Helsinki, Finland.
Wolf, M., Niemann, H., Schmidt, W. (Aug. 1997). Fast Address Block Location on Handwritten and Machine Printed Mail-Piece Images. *Document Analysis and Recognition*, 2, 753-757.
Palumbo, P.W., Srihari, S.N., Soh, J., Sridhar, R., & Demjanenko, V. (Jul. 1992). Postal Address Block Location in Real Time. *Computer*, 25(7), 34-42.
C. Viard-Gaudin and D. Barbra. "A Multi-Resolution Approach to Extract the Address Block on Flat Mail Pieces." Speech Proc. 2, VLSI, Underwater Sig. Proc. IEEE Int'l Conf. on Acoustics, Speech & Sig. Proc. vol. 2, Conf. 16, pp. 2701-2704. Apr. 14, 1991.
J. T. Koljionen and F. R. Glickman. "Comparative Study of Artificial Intelligence Techniques as Applied to the Location of Address Blocks on Mail Pieces." Proc. of the SPIE, vol. 1095, pp. 489-502. Mar. 1989.

*Primary Examiner*—Samir Ahmed
*Assistant Examiner*—Yosef Kassa
(74) *Attorney, Agent, or Firm*—Burns & Levinson LLP; Jacob N. Erlich; Orlando Lopez

(57) ABSTRACT

The systems and methods of this invention provide a simple classifier suitable for real time use. The classifier adapts to changing system conditions and does not require recalculating the details of the classifier.

23 Claims, 9 Drawing Sheets

BEGIN CALCULATING HEIGHT AND WIDTH

EXTRACT X AND Y CENTERS

X CENTER, Y CENTER

HEIGHT, WIDTH

ADAPTIVE SYSTEM AND METHOD FOR PATTERN CLASSIFICATION

BACKGROUND OF THE INVENTION

This invention relates generally to pattern recognition, and, more particularly to a system and method for pattern classification.

In many pattern recognition systems, for the system to operate effectively or most efficiently, it is necessary to recognize an input as belonging to one class of inputs among many possible classes of inputs. For example, when addressed objects are scanned and the scanned information is analyzed to determine the content of the addresses, the efficiency of the analysis is greatly enhanced if the information scanned in regions of interest is classified as belonging to a particular type of region of interest.

A classifier is a system that recognizes an input as being a member of one of many possible classes. The theoretical optimum classifier is a Bayes type classifier. A Bayes type classifier computes the conditional probability of different classes given the values of other attributes and selects the class with the highest conditional probability. The a priori determination of the probabilities would require knowledge of all possible inputs to the system. For a real life system, the knowledge of all possible inputs would be a prohibitive task.

Neural networks and genetic algorithms have been used to approximate the system probabilities from a small number of system inputs. For example, in U.S. Pat. No. 6,021,220 (granted to E. J. Anderholm on Feb. 1, 2000), a genetic algorithm is used to generate an approximation to a Bayes type classifier using a small number of system inputs. There are also numerous examples of neural networks utilized to implement classifiers. In an example related to classifying areas of interest in an addressed object, a neural network is utilized in U.S. Pat. No. 6,014,450 (granted to Hellper et al. on Jan. 11, 2000) to classify blocks as 'TEXT' or "OTHER'. However, the use of neural networks and genetic algorithms results in classifiers that are complex and not as suitable for real time use.

There is a need for a simple classifier suitable for real time use. There is also a need for a classifier that adapts to the changing system conditions and does not require recalculating the details of the classifier.

SUMMARY OF THE INVENTION

The systems and methods of this invention provide simple classifiers suitable for real time use. The classifier of this invention adapts to the changing system conditions and does not require recalculating the details of the classifier.

In one embodiment, the method of this invention generates a classifier by:
(a) creating a database including location data for a first group of patterns from previously analyzed objects, dimensions for each of the previously analyzed objects, and validated previous assignments to one of the number of classes of each pattern from the first group of patterns from previously analyzed objects,
(b) normalizing each location datum belonging to one of the patterns from the first group of patterns from previously analyzed objects with respect to dimensions of a corresponding one of the previously analyzed objects,
(c) creating a normalized geometric grid normalized to dimensions of an object,
(d) deriving predetermined characteristic coordinate data from the normalized location data, and
(e) forming a number of probability distributions, based on the assignment of each pattern of the first group of patterns from previously analyzed objects to one of the classes, each one of the probability distributions assigning a frequency of occurrence of one of the predetermined characteristic coordinates in one of the classes to each one of the points in the normalized geometric grid.

The characteristic data for a second group of patterns and dimensions for a second object are derived from measurements on the second object. The data is classified as belonging to one of the classes in the following manner. Each characteristic datum, from the pattern to be classified, is normalized with respect to the dimensions of the second object. A location is obtained, in the normalized geometric grid, of each characteristic datum from the pattern to be classified. A frequency of occurrence value for each characteristic from the pattern to be classified, in each of the number of classes, is obtained at that location, where the frequency of occurrence value is obtained from one of the probability distributions. The pattern to be classified is, then, assigned to one of the classes based on a predetermined criterion. In one embodiment, the pattern to be classified is assigned to one of the classes based on the largest value of a function of the frequency of occurrence for each one of the characteristic coordinates from that pattern.

The location data for each of the second group of patterns and the assignments of the patterns in the second group of patterns to the classes can be incorporated into the database, enabling the classifier to adapt.

In a further embodiment, the objects are addressed objects in a delivery system, the data is Region-of-Interest characteristic coordinate data and the classes include a return address block class, a delivery address block class, and an indicator of payment item class (such as a stamp class). The processing of information in order to recognize desired characteristics from addressed objects can, then, be optimized since, once the Region-of-Interest is classified as belonging to one of the classes, only desired items in that class need to be recognized.

An embodiment of a system of this invention includes one or more processors, a first memory including a database comprising data obtained from a group of first objects and validated previous assignments to one of the number of classes of that data obtained from the, one or more second computer readable memories having instructions that cause the one or more processors to execute an embodiment of the method of this invention.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

The systems and methods of this invention provide a simple classifier suitable for real time use. The classifier of this invention adapts to the changing system conditions and does not require recalculating the details of the classifier.

Figure 1:
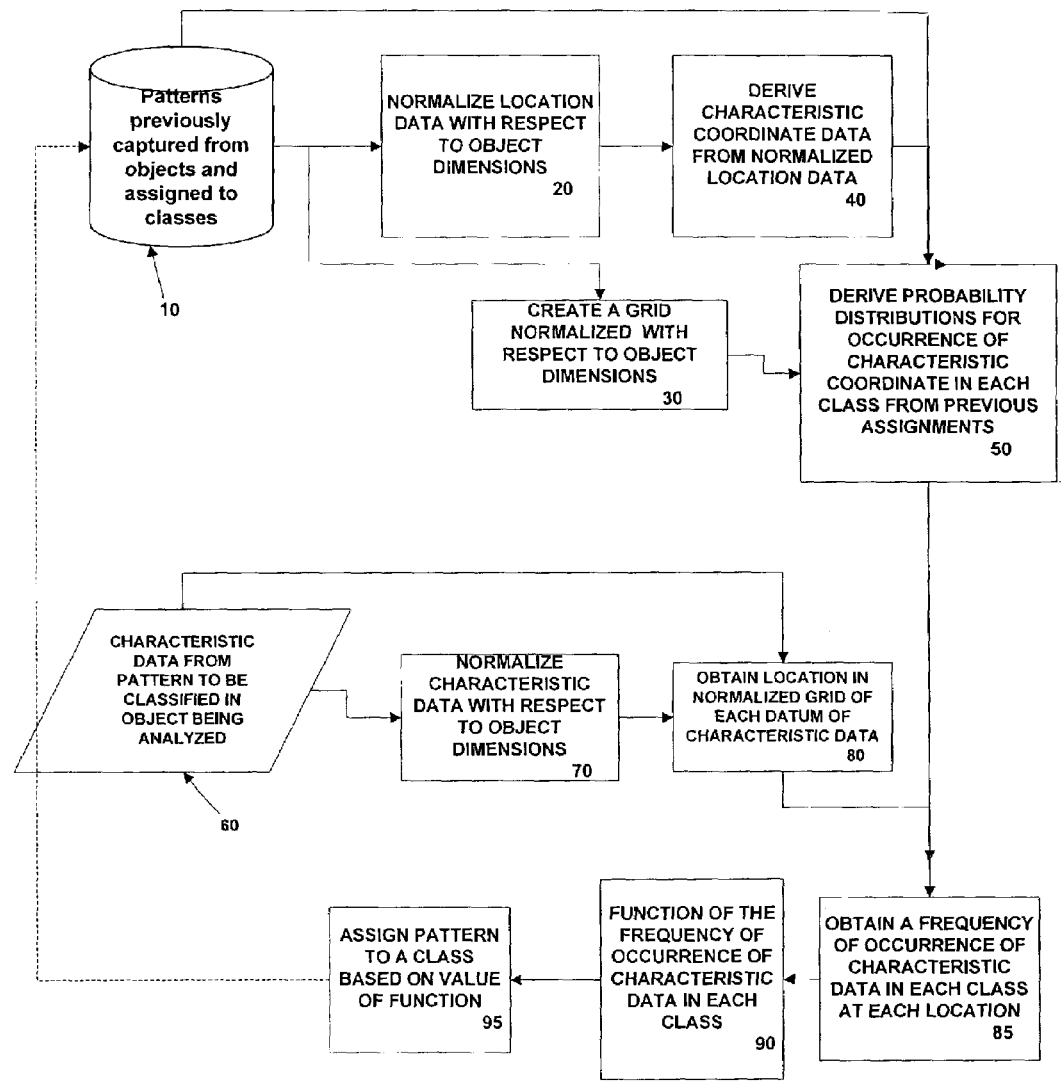
FIG. 1 is a flowchart of an embodiment of the method of this invention.

A flowchart of an embodiment of the method of this invention is shown in FIG. 1. Referring to FIG. 1, a database 10 is created from data that has been obtained from previously analyzed objects. The database 10 includes, for each of the previously analyzed objects, an identifier for each pattern on that object, location data for each pattern on that object, the dimensions of the previously analyzed object, and the validated previous assignment to one of a number of predetermined classes of each pattern on that object. Each location datum, from the data obtained from the previously analyzed objects, is normalized with respect to the dimensions of the corresponding one of the previously analyzed objects (step 20, FIG. 1). A geometric grid, normalized to object dimensions, is created (step 30, FIG. 1). Data for predetermined characteristic coordinates is obtained from the normalized location data (step 40, FIG. 1). Then, a number of probability distributions are formed (step 50, FIG. 1). Each one of the probability distributions assigns a frequency of occurrence of one of the predetermined characteristic coordinates in one of the classes to each point in the geometric grid. Characteristic data for each pattern on the object and dimensions 60 are then obtained for the object being analyzed. Each characteristic datum, for each pattern in the object being analyzed, is normalized with respect to the dimensions of the object being analyzed (step 70, FIG. 1). A location in the normalized geometric grid of each characteristic datum from the characteristic data for each pattern in the object being analyzed, the co-ordinates of the grid point at which the datum resides, is obtained (step 80, FIG. 1).

It should be noted that, although the terms, dimensions and location, conjure the connotation of physical dimensional space, those terms are used, in this invention, in the generalized mathematical sense. It should be noted that the dimensions could also be expressed in transform variables (such as Fourier Transforms yielding generalized frequencies), time and space variables, the space of all sensor outputs, or a space of vector inputs (such as is typical of neural networks) or any convenient mathematical space that aptly characterizes the problem.

A frequency of occurrence value is obtained, from the probability distributions, for the characteristic data from the pattern to be classified, in each of the classes at the location in the normalized geometric grid of each characteristic datum (Step 85, FIG. 1). The frequency of occurrence values, for one of the classes, are inputs to a function that serves as a metric (Step 90, FIG. 1). (Examples of such a function are averages, root-mean square, maximum value functions.) In one embodiment, the pattern to be classified is assigned to the class for which the largest value of the function was obtained (Step 95, FIG. 1). In another embodiment (not shown) the value of the function is compared to a given threshold. For values greater than the threshold, the pattern to be classified is assigned to the class for which the largest value of the function was obtained. Finally, the location data for the pattern which has been classified and the assignment of that pattern to a particular one of the classes are incorporated into the database 10.

Figure 2:
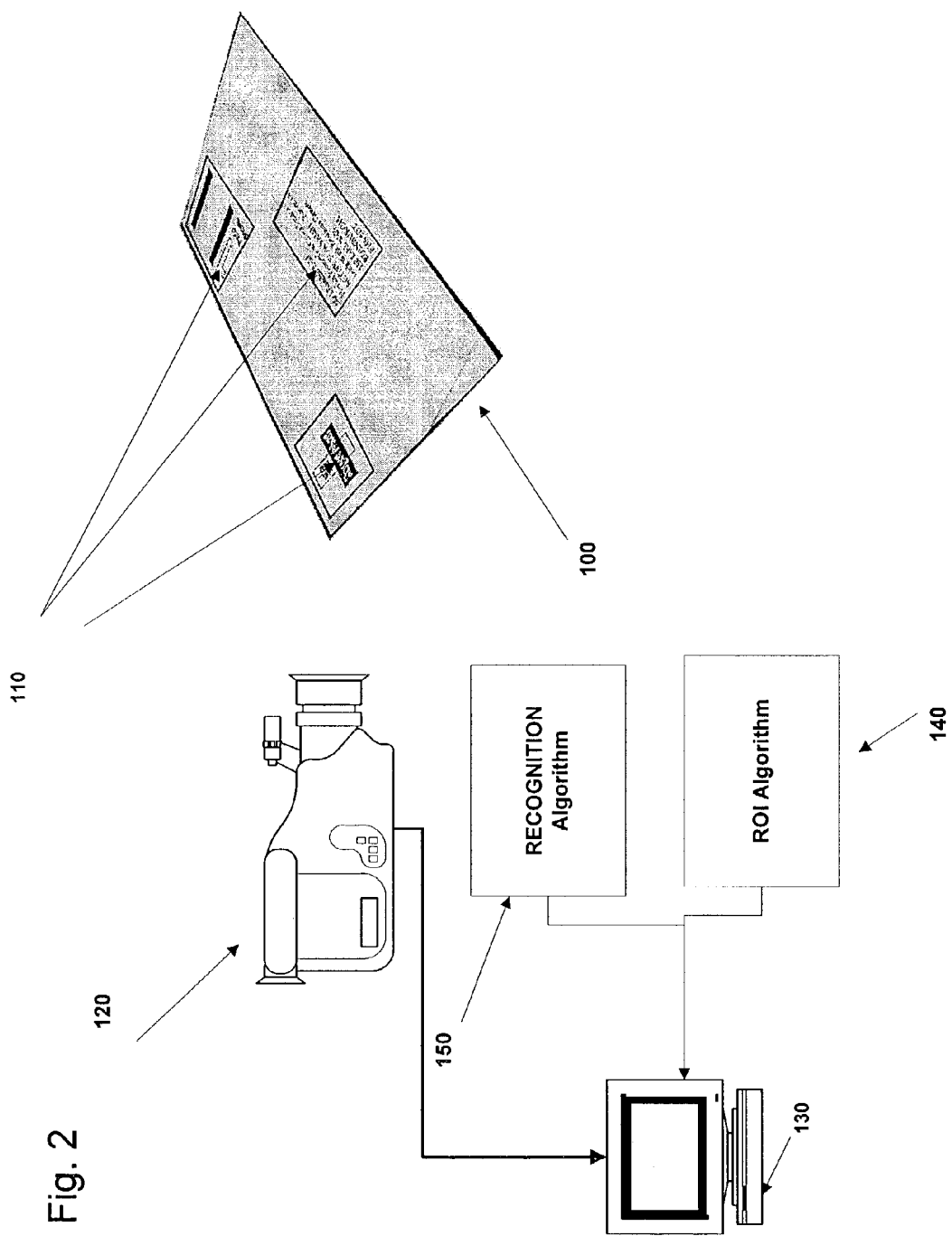
FIG. 2 is a pictorial schematic representation of an addressed object as it is scanned.

In a particular embodiment, further described below, the objects are addressed objects in a delivery system. Referring to FIG. 2, addressed object 100 is scanned by scanning device 120. An image of the addressed object 100 is provided to computing device 130. Computing device 130 includes a Region-of-Interest (ROI) algorithm 140 that extracts the Region-of-Interest coordinates for each of the Regions-of-Interest 110. In this particular embodiment, the coordinates, dimensions and locations correspond to physical dimensional space.

Figure 3:
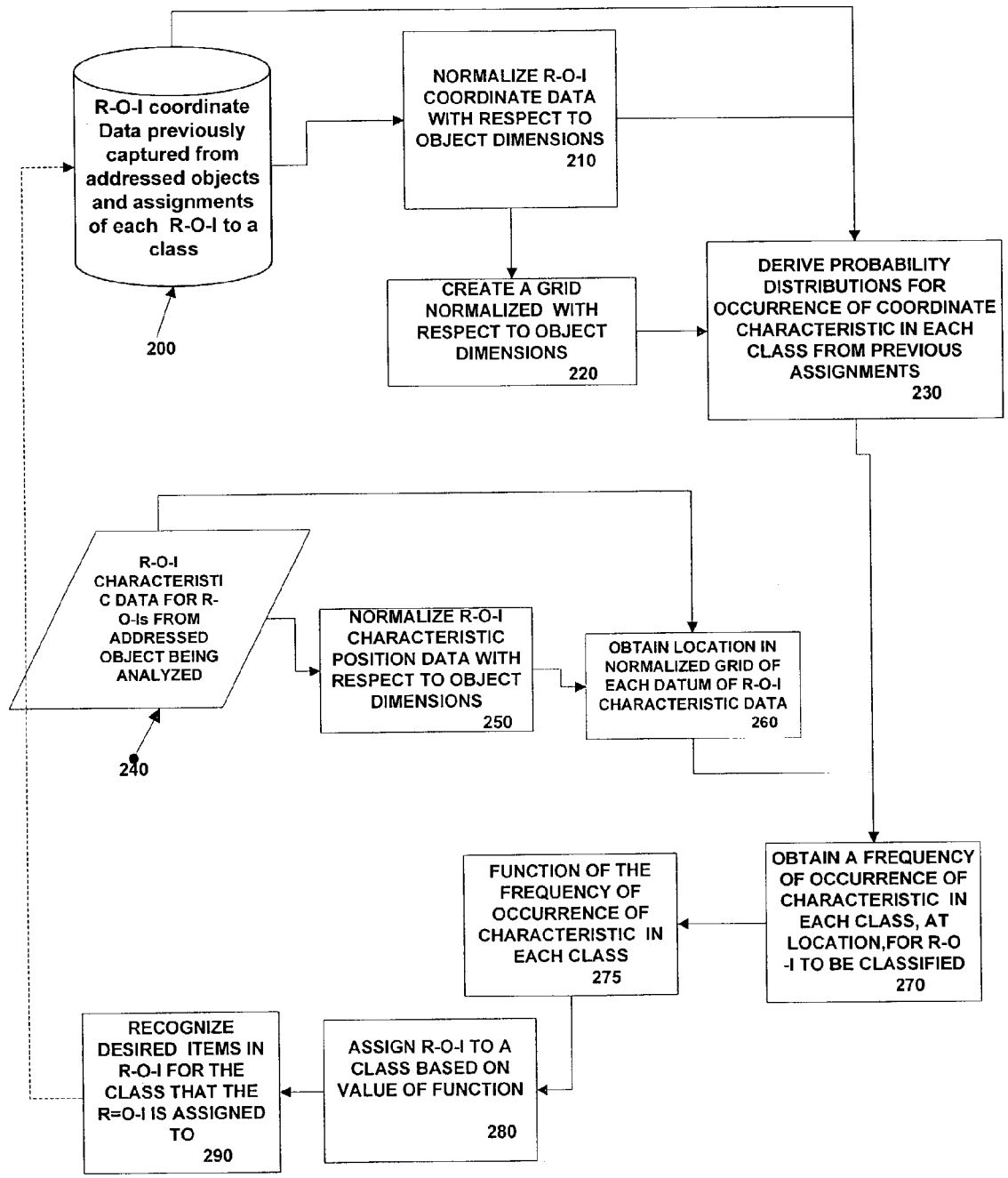
FIG. 3 is a flowchart of another embodiment of the method of this invention.

More specifically, a flowchart of this particular embodiment of the method of this invention is shown in FIG. 3. Referring to FIG. 3, a database 200 is created from data has been obtained from previously analyzed addressed objects. The database 200 includes, for each of the previously analyzed addressed objects, an identifier for each Region-of-Interest on that object, location data for each Region-of-Interest on that addressed object, the dimensions of the previously analyzed addressed object, and the validated previous assignment to one of a number of predetermined classes of each Region-of-Interest on that addressed object. Each Region-of-Interest coordinate datum, from the data obtained from the previously analyzed addressed objects, is normalized with respect to the dimensions of the corresponding one of the previously analyzed addressed objects (step 210, FIG. 3). A geometric grid, normalized to addressed object dimensions, is created (step 220, FIG. 3). Then, a number of probability distributions are formed (step 230, FIG. 3). Each one of the probability distributions assigns, based on the assignment of each of the Regions-of-Interest to one of the classes, a frequency of occurrence of a coordinate characteristic in one of the classes to each point in the geometric grid.

Region-of-Interest coordinate characteristic data 240 are then obtained for each Region-of-Interest in the addressed object being analyzed. In one embodiment, coordinate characteristics include the center, the height, width, and the aspect ratio of the Region-of-Interest. Each Region-of-Interest coordinate characteristic datum, from the Region-of-Interest coordinate characteristic data obtained for the addressed object being analyzed, is normalized with respect to the dimensions of the addressed object being analyzed (step 250, FIG. 3). A location in the normalized geometric grid of each Region-of-Interest coordinate characteristic datum corresponding to the addressed object being analyzed, the co-ordinates of the grid point at which the datum resides, is obtained (step 260, FIG. 3). A frequency of occurrence value of each coordinate characteristic is obtained, from one of the probability distributions, for each of the classes at the location in the normalized geometric grid of each Region-of-Interest coordinate characteristic datum from the Region-of-Interest coordinate characteristic data obtained for the object being analyzed (Step 270, FIG. 3). For each Region-of-Interest in the addressed object being analyzed, and for each class, the frequency of occurrence values of the characteristics are inputs to a function that serves as a metric (Step 275, FIG. 3). (Examples of such a function are averages, root-mean square, maximum value functions.) Each Region-of-Interest in the object being analyzed is assigned to the class for which the largest value of the function was obtained (Step 280, FIG. 3).

It should be noted that the above described method provides a method to locate an address block on an addressed object once an area (region) of interest is identified. The Region-of-Interest (ROI) algorithm that identifies each Region (Area) of Interest in the image of addressed object 100 can be an algorithm such as a software implementation of the correlation and threshold algorithm disclosed in U.S. Pat. No. 5,386,482 or the algorithm for detecting Areas of Interest (AOI) found in M. Wolf et al., "Fast Address Block Location in Handwritten and Printed Mail-piece Images", Proc. Of the Fourth Intl. Conf. on Document Analysis and Recognition, vol.2, pp.753–757, Aug. 18–20, 1997, or the segmentation methods defined in P. W. Palumbo et al., "Postal Address Block Location in Real time", Computer, Vol. 25, No. 7, pp. 34–42, July 1992, or the algorithm for generating address block candidates described in U.S. Pat. No. 6,014,450. Once the Region (area) Of Interest is identified, the method of FIG. 3 is utilized to obtain a probability that the Region (area) Of Interest is an address block. If the probability exceeds a threshold, the Region (area) Of Interest is classified as an address block.

In another embodiment, in which the assignment to classes is utilized to optimize the processing of information in order to recognize desired items from addressed objects, the image data in the Region-of-Interest assigned to the class for which the largest value of the function was obtained is sent to the Recognition algorithm 150, which is also included in computing device 130 (FIG. 2) (step 290, FIG. 3). The processing of information in order to recognize desired characteristics from addressed objects can, then, be optimized since, once the Region-of-Interest is classified as belonging to one of the classes, only desired items in that class need to be recognized.

The Recognition algorithm 150 (FIG. 2) extracts desired information from the Region-of-Interest. Based on the extracted information, the assignment of the Region-of-Interest to one of the classes can be verified as being correct. After the Recognition algorithm 150 has recognized the contents of the Region-of-Interest and the assignment is verified, the Region-of-Interest coordinate data 240 from measurements on the addressed object being analyzed and the assignments of that Region-of-Interest coordinate data to a particular one of the classes are incorporated into the database 200.

Figure 4:
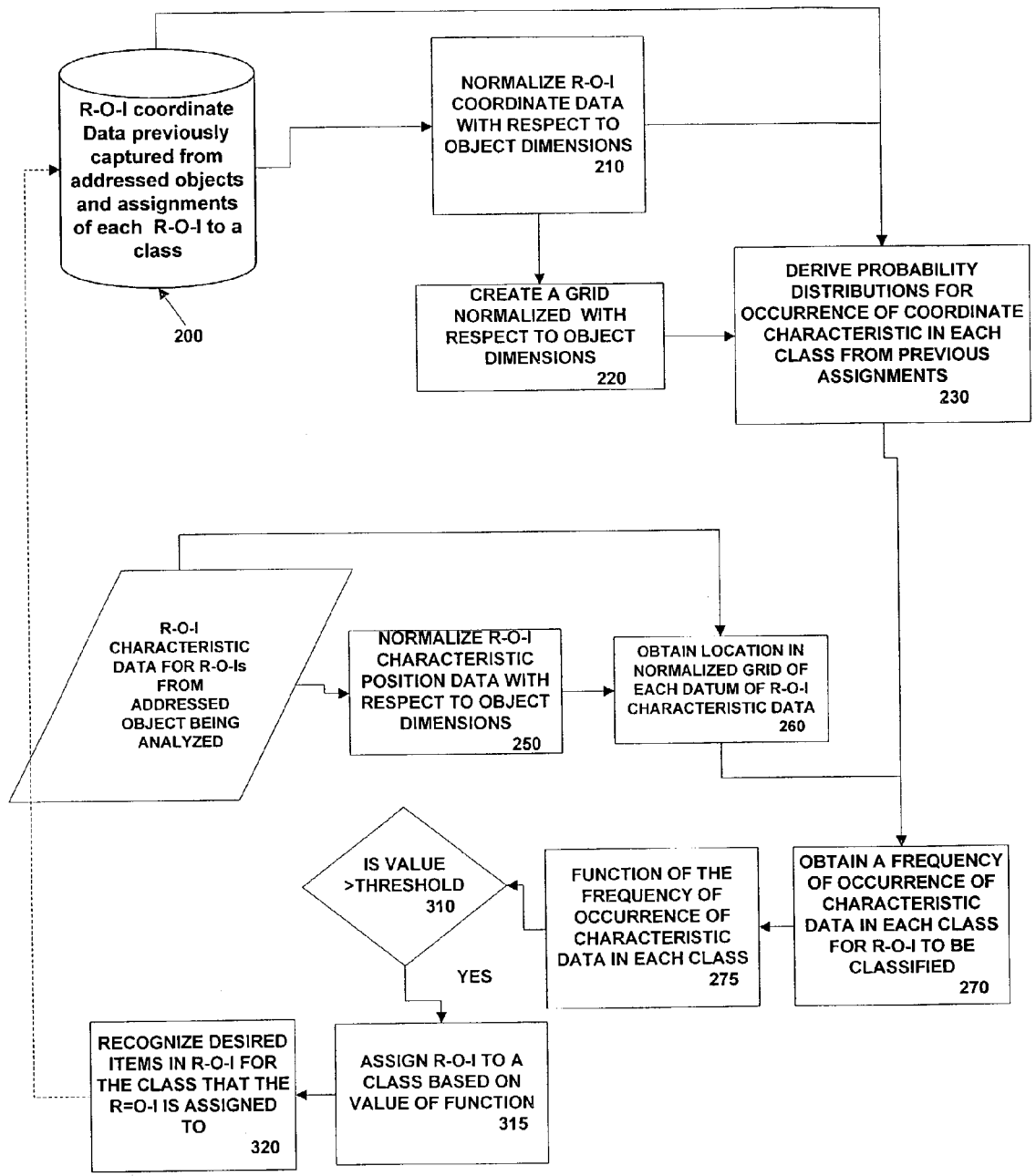
FIG. 4 is a flowchart of a further embodiment of the method of this invention.

Another embodiment of the method of this in invention is shown in FIG. 4. The embodiment disclosed in FIG. 4 differs from that of FIG. 3 only in the method employed after a function value has been obtained (Step 275, FIG. 3 or 4) for each Region-of-Interest in the object being analyzed. The function value is then compared to a given threshold (Step 310, FIG. 4). If the function value is greater than the threshold, each Region-of-Interest in the object being analyzed is assigned to the class for which the largest function value was obtained (Step 315, FIG. 4). After assignment, the image data in the Region-of-Interest assigned to the class for which the largest function value was obtained is sent to the Recognition algorithm 150 (step 320, FIG. 4). As in the method of FIG. 3, the Recognition algorithm 150 extracts desired information from the Region-of-Interest. Based on the extracted information, the assignment of the Region-of-Interest to one of the classes can be verified as being correct. After the Recognition algorithm 150 has recognized the contents of the Region-of-Interest and the assignment is verified, the Region-of-Interest coordinate data 240 from measurements on the addressed object being analyzed and the assignments of that Region-of-Interest to a particular one of the classes are incorporated into the database 200.

It should be noted that if the assignment is not verified by the Recognition algorithm 150, several possible alternative embodiments can be utilized. In one embodiment, if the assignment is not verified, the probability of finding that Region-of-Interest in that particular class is set to zero. The method of FIG. 3 can then be used to assign that Region-of-Interest to a class and repeat the verification. In that second iteration, the database 200 could be the updated database containing the successfully verified Region-of-Interest data for the object being analyzed.

Figure 5:
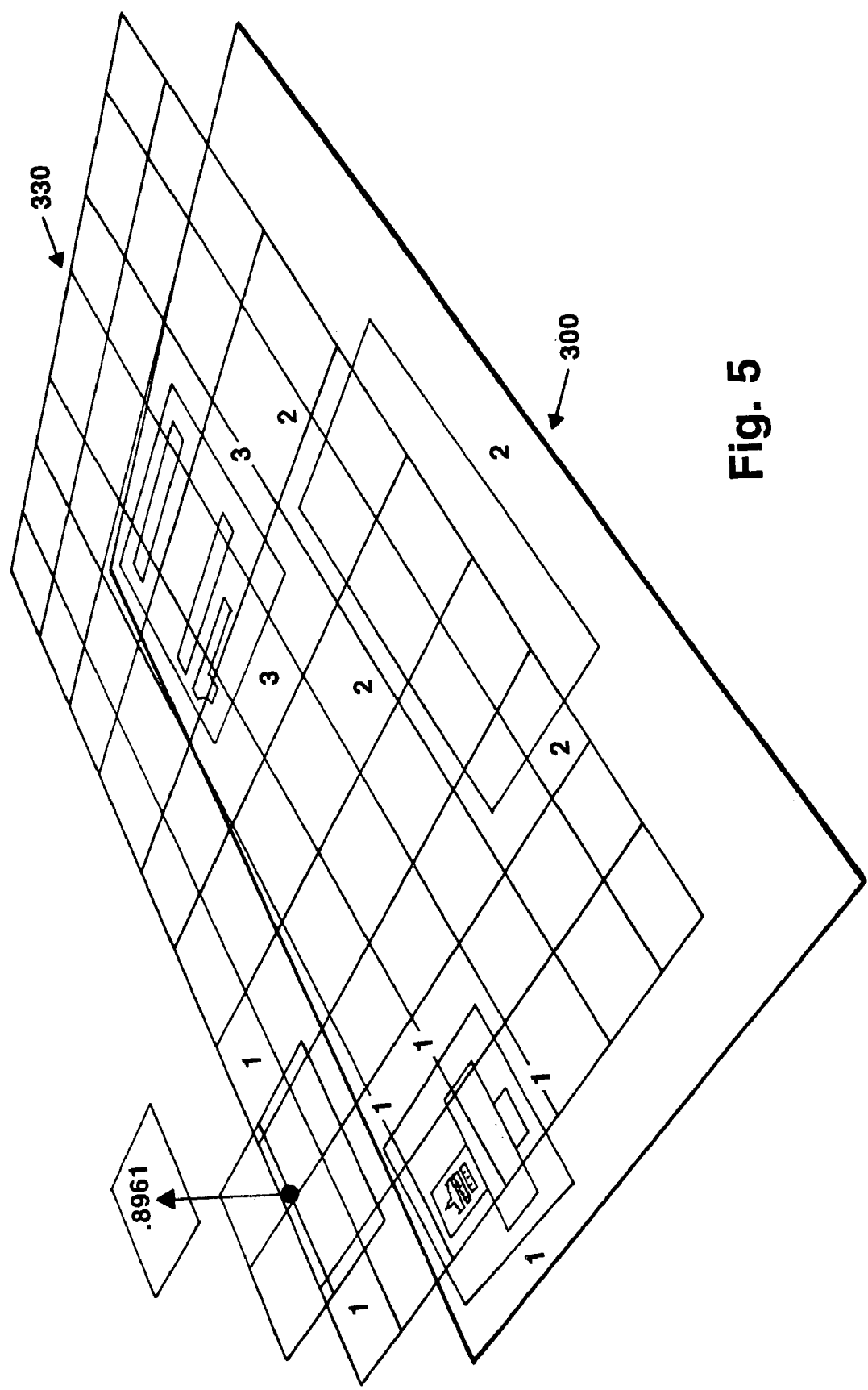
FIG. 5 is a graphical overlay representation of an addressed object and the normalized grid as used in this invention.

In order to even more clearly understand the present invention, reference is made to the following sample embodiment. Addressed object 100 of FIG. 2 includes three Regions of Interest 110. When the scanning device 120 (a digital camera, for example) acquires an image of the addressed object 110 and provides it to computing device 130, the ROI algorithm 140, which is included in the computing device 130, can identify the three Regions of Interest 110 and obtain the coordinates of the rectangle encompassing each Region of Interest. The above described method is an embodiment of the method to obtain the Region-of-Interest coordinates 240 (FIG. 3 or FIG. 4) for the addressed object 100 being analyzed. Each Region-of-Interest coordinate datum, from the coordinate data for each Region-of-Interest obtained for the addressed object 100, is normalized with respect to the dimensions of the addressed object 100 (step 250, FIG. 3 or FIG. 4). As shown in FIG. 5, a normalized grid 330 can be overlaid on the image 300 of the addressed object 100. (For example, a normalized X-Y grid has dimensions of 0 to 1 in the X direction, where 1 represents the height of the object, and 0 to 1 in the Y direction, where a value of 1 in Y corresponds to the width of the object.) Characteristic data, such as the location of the center of the Region-of-Interest and the width and height of the Region-of-Interest as well as the aspect ratio, can be normalized with respect to the dimensions of addressed object image 300 and expressed in terms of the normalized grid 330, as shown in FIGS. 6a and 6b.

The Region-of-Interest coordinates from previously analyzed addressed objects and the assignment of those Regions-of-Interest to predetermined classes are stored in a database 200. In this sample embodiment, the classes include the return address block (RAB) class, the delivery address block (DAB) class, a stamp class and several orientation sub-classes. The characteristic data for each of the Regions-of-Interest from previously analyzed addressed objects is normalized with respect to the corresponding addressed object and referenced to the normalized grid 330. It should be noted that there are several possible approaches to expressing the normalized characteristic data in terms of the normalized grid 330. In the embodiment disclosed herein below, the nearest neighbor prescription for expressing the normalized characteristic data in terms of the normalized grid 330 is utilized. In the nearest neighbor prescription, a value is assigned to a grid point if it is located-within the interval between that grid point and the midpoint of the distance between that grid point and the nearest grid point.

For a particular characteristic datum, or a particular characteristic data pair, from a particular Region-of-Interest, the number of samples, from previously analyzed objects, assigned to a given class and sub-class and located at a particular grid point can be obtained. That number of samples when divided by the total number of samples, from previously analyzed objects, assigned to a given class and sub-class provides the frequency of occurrence of samples assigned to a given class and sub-class. These frequencies of occurrence constitute a discrete probability distribution. That is, the probability of finding a sample in a given grouping, a grouping being a class and sub-class, at a particular grid point is given by $$\frac{\text{\# of samples assigned to a given grouping at a grid point}}{\text{total \# of samples assigned to a given grouping}}$$

Figure 6B:
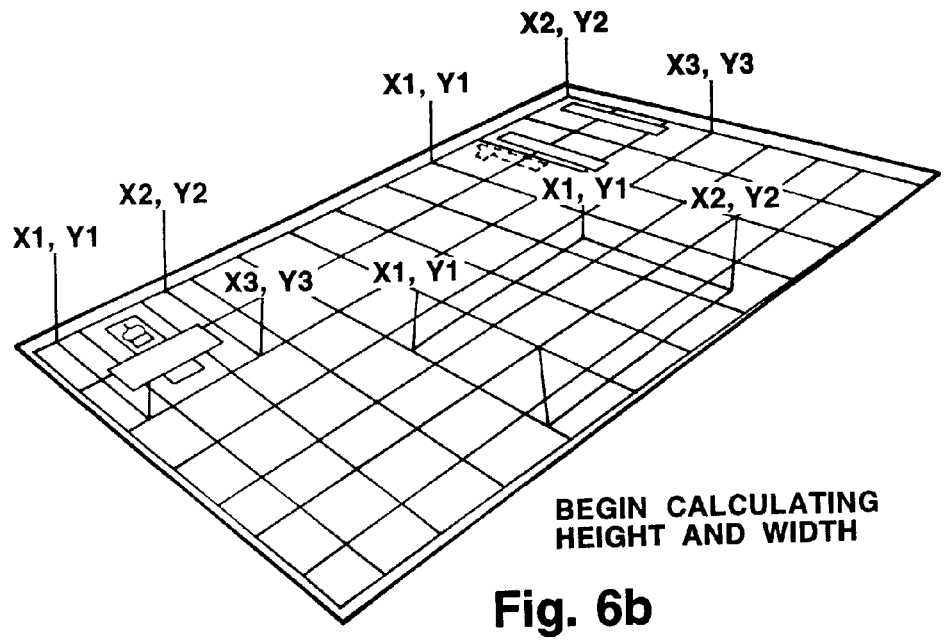
FIG. 6b is also graphical representation of an addressed object and the normalized grid as used in this invention and further depicts the calculation of characteristic data.
Figure 6A:
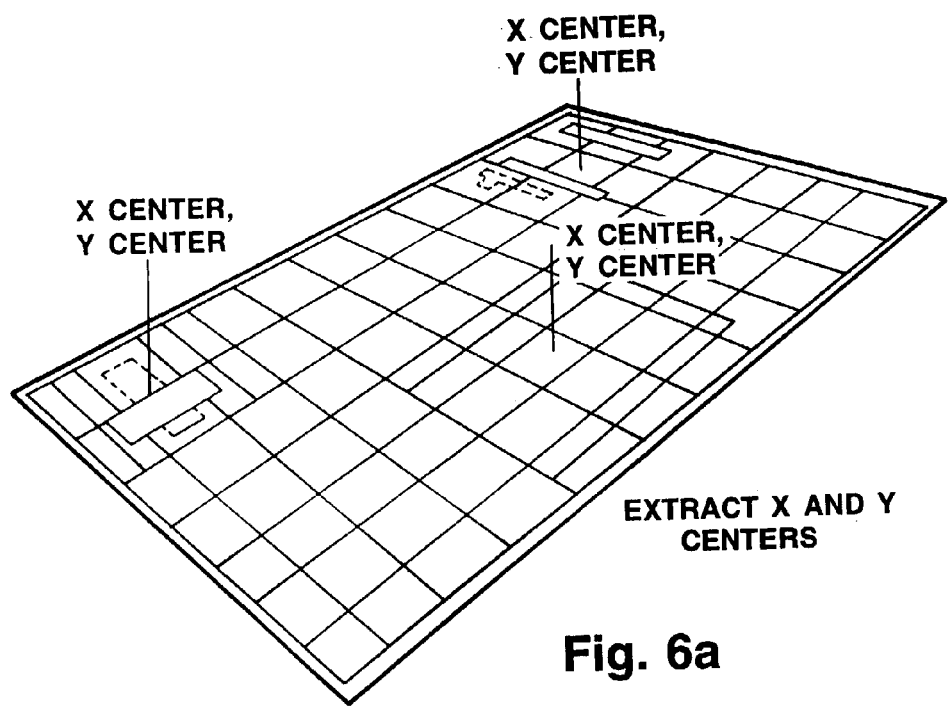
FIG. 6a is also graphical representation of an addressed object and the normalized grid as used in this invention and depicts the calculation of characteristic data.
Figure 7B:
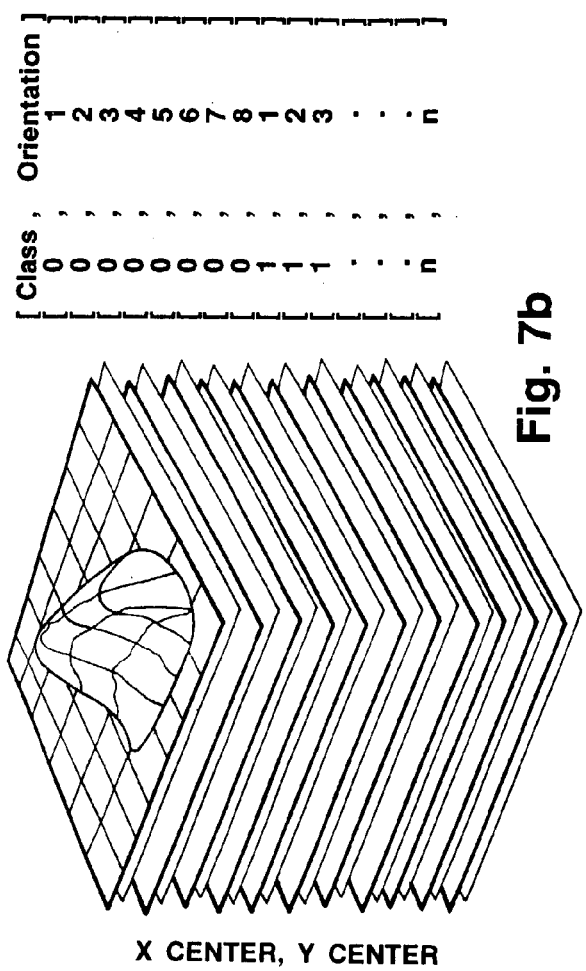
FIG. 7b is a graphical representation of another probability distribution as used in this invention.
Figure 7A:
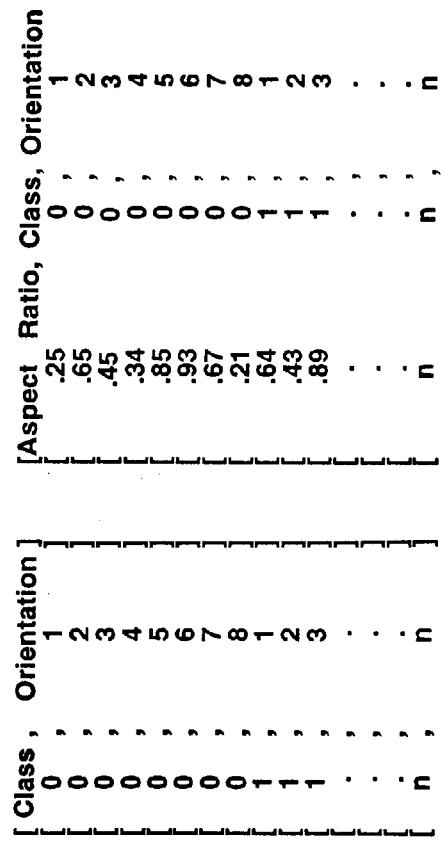
FIG. 7a is a graphical representation of a probability distribution as used in this invention.
Figure 7A:
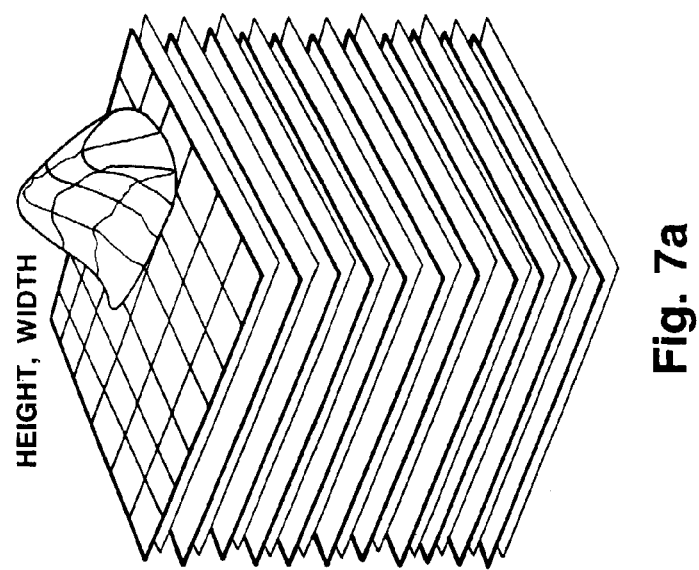

For example, as shown in FIGS. 6a and 6b, using as characteristic data the X and Y coordinates of the location of the center of the Region-of-Interest, the number of Region-of-Interest samples assigned to the delivery address block class in orientation 1 having X and Y coordinates of the location of the center of the Region-of-Interest at a given grid point can be obtained. Dividing that number by the total number of Region-of-Interest samples assigned to the delivery address block class in orientation 1 provides the probability of finding a Region-of-Interest sample with X and Y coordinates of the location of the center of the Region-of-Interest at the given grid point in the delivery address block class with orientation Using the frequency of occurrence of each characteristic datum in a class, probability distributions are generated, as shown in the graphs of FIGS. 7a, 7b.

Using each characteristic datum or pair of characteristic data, such as the location of the center of the Region-of-Interest or the width and height of the Region-of-Interest or the aspect ratio, a probability of finding that Region-of-Interest with that characteristic datum or pair of characteristic data, in a given class and orientation, is provided by the corresponding probability distribution for that characteristic datum or pair of characteristic data. In this sample embodiment, the probability of finding that Region-of-Interest in a given class is obtained by a taking the average over characteristic data or pair of characteristic data of the probabilities of finding that Region-of-Interest in a given class and orientation for that characteristic datum or pair of characteristic data. In this sample embodiment, the probabilities of finding, in a given class and orientation, a Region-of-Interest with that center of the Region-of-Interest and of finding a Region-of-Interest with that width and height of the Region-of-Interest and of finding a Region-of-Interest with that aspect ratio, are averaged. The result of the averaging provides a probability of occurrence of that Region-of-Interest in the given class and orientation. The above procedure is performed for each class and orientation and a probability of occurrence of that Region-of-Interest is obtained for each class and orientation. That Region-of-Interest is assigned to a class and orientation based on the greatest probability of occurrence.

It should be noted that other embodiments besides averaging are possible in order to obtain a single probability from the probabilities for each characteristic datum or pair of characteristic data. A number of metrics are used to map a bounded hyperspace to a line segment; for example, the root mean square metric could be used. The choice of metric depends on the specific application of the classifier.

After assignment, the image data in the Region-of-Interest is provided to the Recognition algorithm 150.

Figure 8:
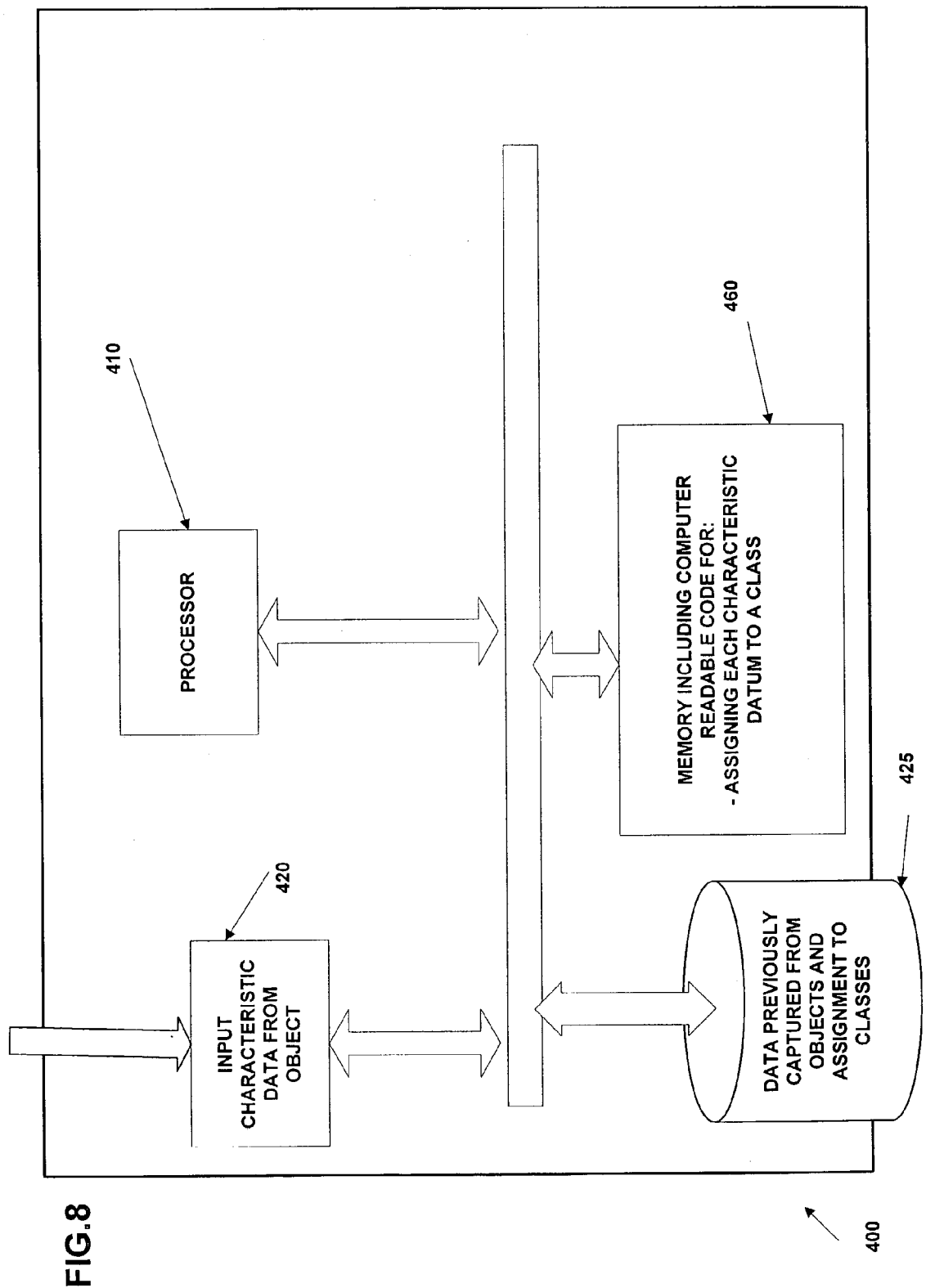
FIG. 8 is a block diagram representation of an embodiment of the system of this invention.

A block diagram representation of an embodiment of the system of this invention is shown in FIG. 8. Referring to FIG. 8, the system 400 includes one or more processors 410, a computer readable memory 425 containing a database, where the database includes location data for patterns from previously analyzed objects, the dimensions of the previously analyzed objects and also including validated previous assignments to one of a number of predetermined classes of the patterns from previously analyzed objects. The system 400 also includes means 420 for receiving input characteristic data for each pattern on the object and dimensions for the object being analyzed and another computer readable memory 460 in which computer readable code is embodied which causes the one or more processors 410 to execute a method to assign a pattern to a class, such as that given in FIG. 1. It should be noted that typical embodiments for means 420 are, but not limited to, interface circuits that receive input information and convert to a form amenable to the processor. The details of the circuits depend on the details of the source of input information. For example, if the input information is gathered utilizing a digital camera with a given digital interface (USB, for example), means 420 include interface circuits for the given interface, means for retrieving the digital image (computer readable code embodied in a computer readable memory, for example) and one or more computer readable memories to store the input image.

Figure 9:
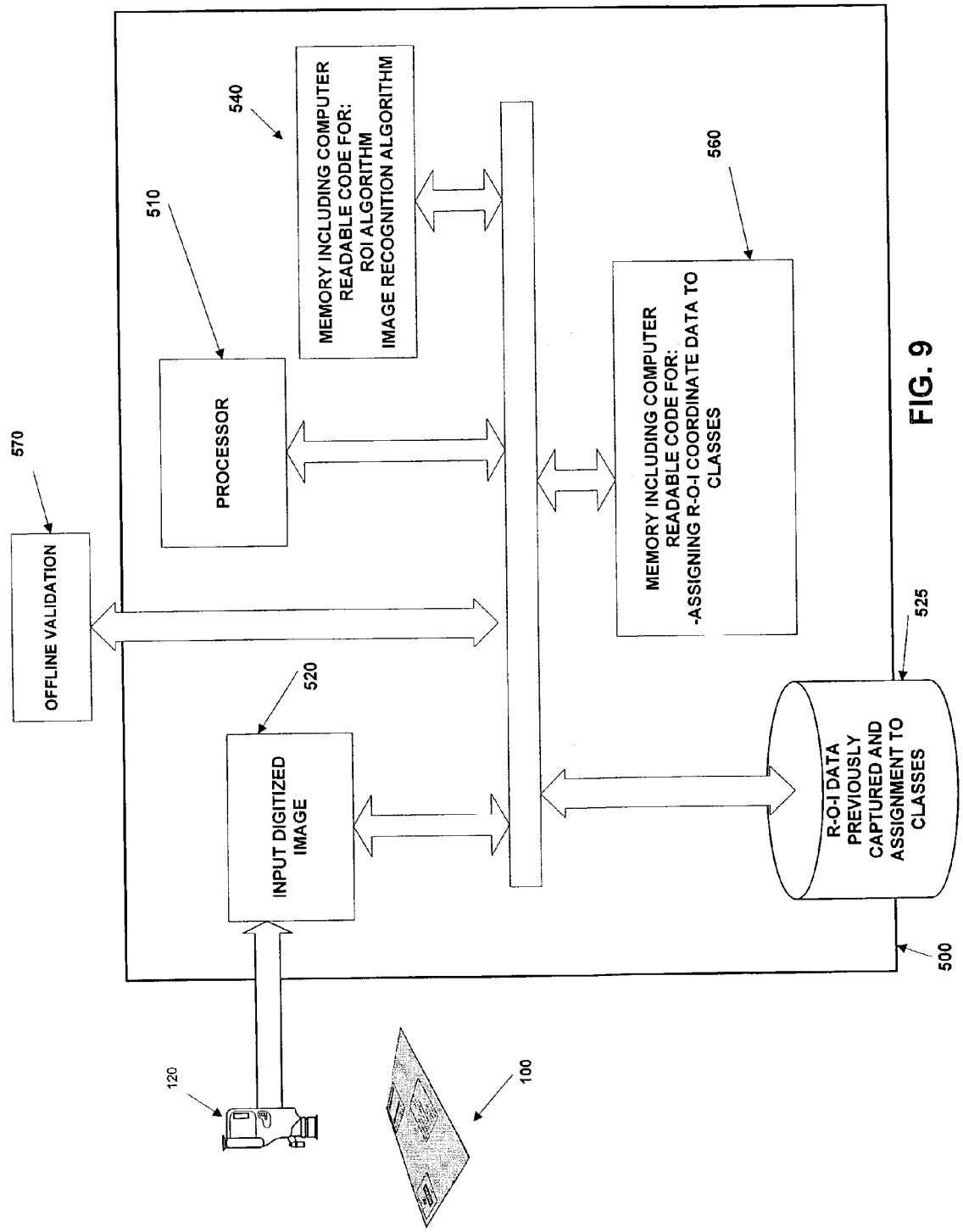
FIG. 9 is a block diagram representation of another embodiment of the system of this invention.

The methods of this invention can be implemented and included in a system for recognizing the addresses of objects to be delivered by a delivery service. FIG. 9 is a block diagram representation of an embodiment of this invention implemented in a system for recognizing the addresses of objects to be delivered by a delivery service. Referring to FIG. 9, addressed object 100 is scanned by scanning device 120. A digitized input image 520 of the addressed object 100 is provided to system 500. Providing the digitized input image 520 includes interfacing the camera to the system 500 and storing the image in a computer readable memory (not shown). The system 500 also includes one or more processors 510, a first computer readable memory containing a database 525, where the database includes Region-of-Interest coordinate data obtained from previously analyzed addressed objects and also includes validated previous assignments to one of a number of predetermined classes of each of the Regions-of-Interest from the previously analyzed addressed objects. The system 500 further includes a second computer readable memory 560 in which computer readable code is embodied which causes the one or more processors 510 to execute methods that identify Regions-of-Interest in the image of addressed object 100 and extract the Region-of-Interest coordinates for each of the Regions-of-Interest (a Region-of-Interest-ROI-algorithm), and methods that extract desired information from the Region-of-Interest (a Recognition algorithm). Also included in the system 500 is a third computer readable memory 540 in which computer readable code is embodied which causes the one or more processors 510 to execute a method to assign each Region-of-Interest in the image of addressed object 100 to a predetermined class (in one embodiment, for example, the method of FIG. 3). In one mode of operation of the system of FIG. 9, scanning device 120 (a digital camera, for example) acquires an image of addressed object 100 and the image is provided as input to the system 500 by input module 520. The Region-of-Interest (ROI) algorithm expressed in the computer readable code embodied in the second memory 540, when executed by the processor 510, results in the identification of each Region-of-Interest in the image of addressed object 100 and the obtaining of the coordinates of each identified Region-of-Interest. The Region-of-Interest coordinate characteristic data, obtained for each Region-of-Interest in the addressed object 100, is utilized in the method expressed in the computer readable code embodied in the third memory 560 which, when executed by the processor 510, causes each Region-of-Interest in the addressed object 100 to be assigned to a predetermined class. After assignment, the image data in the Region-of-Interest assigned to one of the predetermined classes serves as input to the methods that extract desired information from the Region-of-Interest (a Recognition algorithm). The processor 510 executes the Recognition algorithm embodied in the second memory 540 and extracts the desired information. After the Recognition algorithm has executed, the assignment of the Region-of-Interest can be verified as part of executing the method embodied in the third memory 560. After successful verification, as part of executing the method embodied in the third memory 560, the Region-of-Interest coordinate data from the image of the addressed object 100 and the assignments of that Region-of-Interest to a particular one of the classes can be incorporated into the database contained in the first memory 525. The system 500 also includes means for offline verification 570 of the assignment of the Region-of-Interest. Means of offline verification 570 (also referred to as Offline Validation) can include means for displaying the assignment (such as a CRT or video display unit or video monitor or a hard copy output device) and means for input of the verification (such as a keyboard or mouse). The offline verification means 570 enable the system 500 to be used for creating the database contained in the first memory 525.

It should be noted that the second memory 540 and third memory 560 could be combined into one memory. Elements and components described herein may be further divided into additional components or joined together to form fewer components for performing the same functions.

The Region-of-Interest (ROI) algorithm that identifies each Region-of-Interest in the image of addressed object 100 can be an algorithm such as a software implementation of the correlation and threshold algorithm disclosed in U.S. Pat. No. 5,386,482 or the algorithm for detecting Areas of Interest (AOI) found in M. Wolf et al., "Fast Address Block Location in Handwritten and Printed Mail-piece Images", Proc. Of the Fourth Intl. Conf. on Document Analysis and Recognition, vol.2, pp.753–757, Aug. 18–20, 1997 or the segmentation methods defined in P. W. Palumbo et al., "Postal Address Block Location in Real time", Computer, Vol. 25, No. 7, pp. 34–42, July 1992. Recognition algorithms, known in the art as character recognition algorithms, are commercially available for printed characters (as described in A. Belaid. "OCR:Print An Overview", http://citeseer.nj.nec.com/110282.html, and references therein) and for some applications involving handwritten characters (as described in J. Park, "Hierarchical Character Recognition And Its Use In Handwritten Word/Phrase Recognition", Ph. D. Dissertation, November 1999, SUNY Buffalo).

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method of assigning a pattern to one of a plurality of classes, said method comprising the steps of:
    creating a database comprising data from a group of first objects, the data corresponding to each one object from said group of first objects comprising:
        an identifier for each pattern included in said one object, said pattern being one of a plurality of first patterns,
        location data for each said pattern,
        dimension data for said one object,
        and validated previous assignments of each said pattern to one of the plurality of classes;
    normalizing each location datum corresponding to one of said plurality of first patterns, normalized with respect to dimensions of a corresponding one of said group of first objects to provide normalized location data of the group of first objects;
    creating a normalized geometric grid normalized to object dimensions, said normalized geometric grid comprising a plurality of points;
    deriving data for predetermined characteristic coordinates for each pattern in said plurality of first patterns from the normalized location data;
    forming a plurality of probability distributions, based on the assignment of each one of said plurality of first patterns to one of said plurality of classes;
    assigning a frequency of occurrence of each one of the predetermined characteristic coordinates in one of said plurality of classes to each one of said plurality of points in said normalized geometric grid, said assignment based on one of said plurality of probability distributions;
    deriving the predetermined characteristic coordinate data values for a second pattern, and, dimensions for a second object from measurements on the second object;
    normalizing, with respect to second object dimensions, each predetermined characteristic coordinate data value for the second pattern;
    obtaining a location in said normalized geometric grid of each normalized characteristic coordinate datum value from the second pattern;

obtaining a frequency of occurrence value for each one of the predetermined characteristic coordinates in each of said plurality of classes at the location of said characteristic coordinate data from the second pattern, said frequency of occurrence value obtained from one of said plurality of probability distributions;

assigning the second pattern to one of said plurality of classes based on predetermined criteria.

2. The method of claim 1 wherein the predetermined criteria is established by the step of assigning the second pattern to one of said plurality of classes based on a largest value of a function of the frequency of occurrence for each one of the characteristic coordinates from the second pattern.

3. The method of claim 1 wherein the predetermined criteria established by the steps of:
   obtaining a value, for each of said plurality of classes, from a function of the frequency of occurrence for each one of the characteristic coordinates from the second pattern;
   comparing said value for each of said plurality of classes to a given threshold; and,
   assigning, if the value is above the given threshold, the second pattern to one of a plurality of classes based on the largest value.

4. The method of claim 1 further comprising the step of incorporating location data for the second pattern, dimensions for the second object and the assignments of each of the second pattern to one of said plurality of classes into the database;
   whereby, the method adapts to changes in patterns.

5. A computer program product comprising:
   a computer usable medium having computer readable code embodied therein for assigning a pattern to one of a plurality of classes, said code capable of causing a computer system to:
      normalize each location datum corresponding to one of a plurality of first patterns, normalized with respect to dimensions of a corresponding one of a group of first objects to provide normalized location data of the group of first objects;
      create a normalized geometric grid normalized to object dimensions, said normalized geometric grid comprising a plurality of points;
      derive data for predetermined characteristic coordinates from the normalized location data;
      form a plurality of probability distributions, based on an assignment of each one of said plurality of first patterns to one of said plurality of classes;
      assign a frequency of occurrence, in one of said plurality of classes, of each of the predetermined characteristic coordinates to each one of said plurality of points in said normalized geometric grid, said assignment based on one of said plurality of probability distributions;
      derive predetermined characteristic coordinate data values for a second pattern and dimensions of a second object from measurements on the second object;
      normalize, with respect to the second object dimensions, each predetermined characteristic coordinate data value for the second pattern;
      obtain a location in said normalized geometric grid of each normalized characteristic coordinate data value for the second pattern;
      obtain a frequency of occurrence value for each one of the predetermined characteristic coordinates in each of said plurality of classes at the location of each said characteristic coordinate data value from the second pattern, said frequency of occurrence value obtained from one of said plurality of probability distributions;
      assign the second patterns to one of a plurality of classes based on based on predetermined criteria.

6. The computer program product of claim 5 wherein, in the computer readable code, the predetermined criteria comprises assigning the second pattern to one of said plurality of classes based on a largest value of a function of the frequency of occurrence for each one of the characteristic coordinates from the second pattern.

7. The computer program product of claim 5 wherein, in the computer readable code, the predetermined criteria comprises the steps of:
   obtaining a value, for each of said plurality of classes, from a function of the frequency of occurrence for each one of the characteristic coordinate data from the second pattern;
   comparing said value a given threshold; and,
   assigning, if the value is above the given threshold, the second pattern to one of said plurality of classes based on the largest value.

8. The computer program product of claim 5 where the computer readable code further causes a computer system to:
   incorporate location data for the second pattern, dimensions for the second object and the assignments of the second pattern to one of the plurality of classes into a database.

9. A system for assigning a pattern to one of a plurality of classes, said system comprising:
   at least one processor;
   a first memory for storing data for access by a process executed by at least one processor, said memory comprising:
      a database comprising data from a group of first objects, the data corresponding to each one object from said group of first objects comprising:
         an identifier for each pattern included in said one object, said pattern being one of a plurality of first patterns,
         location data for each said pattern,
         dimensions for said one object,
         and validated previous assignments of each said pattern to one of the plurality of classes;
   at least one second computer readable memory having instructions embodied therein, said instructions causing said at least one processor to:
      normalize each location datum corresponding to one of said plurality of first patterns, normalized with respect to dimensions of a corresponding one of a group of first objects to provide normalized location data of the group of first objects;
      create a normalized geometric grid normalized to object dimensions, said normalized geometric grid comprised of a plurality of points;
      derive data for predetermined characteristic coordinates from the normalized location data;
      form a plurality of probability distributions, based on an assignment of each of said plurality of first patterns to one of said plurality of classes;
      assigning a frequency of occurrence of each one of the predetermined characteristic coordinates in one of said plurality of classes to each one of said plurality of points in said normalized geometric grid, said assignment based on one of said plurality of probability distributions;

derive the predetermined characteristic coordinate data values for a second pattern and dimensions for a second object from measurements on the second object;

normalize, with respect to second object dimensions, each predetermined characteristic coordinate data value for the second pattern;

obtain a location in said normalized geometric grid of each normalized predetermined characteristic coordinate data value from the second pattern;

obtain a frequency of occurrence value for each one of the predetermined characteristic coordinates in each of said plurality of classes at the location of each said characteristic coordinate data value from the second pattern, said frequency of occurrence value obtained from one of said plurality of probability distributions;

assign the second pattern to one of a plurality of classes based on predetermined criteria.

10. The system of claim 9 wherein the instructions embodied in the at least one second computer readable memory further cause said at least one processor to incorporate location data for the second pattern, dimensions for the second object and the assignments of the second pattern to one of the plurality of classes into the database.

11. The system of claim 9 wherein, in the instructions embodied in the at least one second computer readable memory, the predetermined criteria comprises assigning the second pattern to one of a plurality of classes based on a largest value of a function of the frequency of occurrence for each one of the characteristic coordinates from the second pattern.

12. The system of claim 9 wherein, in the instructions embodied in the at least one second computer readable memory, the predetermined criteria comprises the steps of:

obtaining a value, for each of said plurality of classes, from a function of the frequency of occurrence for each one of the characteristic coordinates from the second pattern;

comparing said value a given threshold; and, assigning, if the value is above the given threshold, the second pattern to one of a plurality of classes based on the largest value.

13. A system for recognizing the addresses of objects to be delivered by a delivery service comprising:

at least one processor;

a first memory for storing data for access by a process executed by at least one processor, said memory comprising:

a database comprising data from a group of first addressed objects, the data corresponding to each one addressed object from said group of first addressed objects comprising:

an identifier for each Region-of-Interest included in said one addressed object, said Region-of-Interest being one of a plurality of first Regions-of-Interest, location data for each said Region-of-Interest, dimensions for said one addressed object, and validated previous assignments of each said Region-of-Interest to one of a plurality of classes;

at least one second computer readable memory having instructions embodied therein, said instructions causing said at least one processor to:

normalize each coordinate datum belonging to one of said plurality of first Regions-of-Interest, normalized with respect to dimensions of a corresponding one of said group of first addressed objects to provide normalized location data of the group of first objects;

create a normalized geometric grid normalized to object dimensions, said normalized geometric grid comprising a plurality of points;

form a plurality of probability distributions, based on an assignment of each one of said plurality of first Regions-of-Interest to one of said plurality of classes;

assigning a frequency of occurrence of a predetermined coordinate characteristic in one of said plurality of classes to each one of said plurality of points in said normalized geometric grid, said assignment based on one of said plurality of probability distributions;

derive predetermined coordinate characteristic data for a plurality of second Regions-of-Interest and dimensions for a second addressed object from measurements on the second addressed object;

normalize each predetermined coordinate characteristic datum for each of the plurality of second Regions-of-Interest with respect to second addressed object dimensions;

obtain a location in said normalized geometric grid of each of said predetermined coordinate characteristic data for each of the plurality of second Regions-of-Interest;

obtain a frequency of occurrence for each of said predetermined coordinate characteristic data, from each of the plurality of second Regions-of-Interest, in each of said plurality of classes at said location;

obtain a plurality of values, one of said plurality of values for each of said plurality of classes, from a function of the frequency of occurrence for each one of the predetermined characteristic coordinate data from each of the plurality of second Regions-of-Interest;

assign each one of the plurality of second Regions-of-Interest to one of a plurality of classes based on a largest one of said plurality of values from said one of the plurality of second Regions-of-Interest;

recognize desired items in selected ones of the plurality of second Regions-of-Interest, said selection based on said assignment to a specific class from the plurality of classes of each one of the plurality of second Regions-of-Interest.

14. The system of claim 13 wherein the instructions embodied in the at least one second computer readable memory are capable of further causing said at least one processor to:

incorporate location data for each one of the plurality of second Regions-of-Interest, the dimensions for the second addressed object and the assignments of each one of the plurality of second Regions-of-Interest to the plurality of classes into the database.

15. The system of claim 13 wherein the instructions embodied in the at least one second computer readable memory are capable of further causing said at least one processor to:

compare each one of said plurality of values from each of the plurality of second Regions-of-Interest to a given threshold; and, abstain from recognizing desired items in one of the plurality of second Regions-of-Interest if a largest one of said plurality of values, from said one of the plurality of second Regions-of-Interest, in a specific class from the plurality of classes, is less than the given threshold.

16. A method of assigning Regions-of-Interest to one of a plurality of classes, said method comprising the steps of:
creating a database comprising data from a group of first addressed objects, the data corresponding to each one addressed object from said group of first addressed objects comprising:
an identifier for each Region-of-Interest included in said one addressed object from said group of first addressed objects, said Region-of-Interest being one of a plurality of first Regions-of-Interest,
location data for each said Region-of-Interest,
dimensions for each said one addressed object,
and, validated previous assignments to one of the plurality of classes of each said Region-of-Interest;
normalizing each location datum belonging to one Region-of-Interest from said plurality of first Regions-of-Interest, normalized with respect to dimensions of a corresponding one of said group of first addressed objects to provide normalized location data of the group of first objects;
creating a normalized geometric grid normalized to object dimensions, said normalized geometric grid comprised of a plurality of points;
forming a plurality of probability distributions, based on an assignment of each of said plurality of first Regions-of-Interest to one of said plurality of classes;
assigning a frequency of occurrence of a predetermined coordinate characteristic in one of said plurality of classes to each one of said plurality of points in said normalized geometric grid, said assignment based on one of said plurality of probability distributions;
deriving predetermined coordinate characteristic data for a plurality of second Regions-of-Interest and dimensions for a second addressed object from measurements on the second addressed object;
normalizing each predetermined coordinate characteristic datum for each of the plurality of second Regions-of-Interest with respect to second addressed object dimensions;
obtaining a location in said normalized geometric grid of each of said normalized predetermined coordinate characteristic data for each of the plurality of second Regions-of-Interest;
obtaining a frequency of occurrence for each of said coordinate characteristic data, from each of the plurality of second Regions-of-Interest, in each of said plurality of classes at said location;
assigning each one of the plurality of second Regions-of-Interest to one of the plurality of classes based on a largest value of a function of the frequency of occurrence for each of said coordinate characteristic datum corresponding to said one of the plurality of second Regions-of-Interest.

17. The method of claim 16 further comprising the step of incorporating the predetermined coordinate characteristic data for each)one of the plurality of second Regions-of-Interest, the dimensions for the second addressed object and the assignments of each one of the plurality of second Regions-of-Interest to the plurality of classes into the database;
whereby, the method adapts to changes in addressed objects.

18. The method of claim 16 wherein the plurality of classes comprises a return address block class, a delivery address block class, and an indicator of payment item class.

19. A method for optimizing the processing of information in order to recognize desired items from addressed objects, said method comprising the steps of:
creating a database comprising data from a group of first addressed objects, the data corresponding to each one addressed object from said group of first objects comprising:
an identifier for each Region-of-Interest included in said one addressed object from said group of first addressed objects, said Region-of-Interest being one of a plurality of first Regions-of-Interest,
location data for each said Region-of-Interest,
dimensions for each said one addressed object from said group of first addressed objects,
and validated previous assignments to one of a plurality of classes of each said Region-of-Interest;
normalizing each coordinate datum belonging to one of said plurality of first Regions-of-Interest, normalized with respect to dimensions of a corresponding one of said group of first addressed objects;
creating a normalized geometric grid normalized to addressed object dimensions, said normalized geometric grid comprised of a plurality of points;
forming a plurality of probability distributions, based on an assignment of each of said plurality of first Regions-of-Interest to one of said plurality of classes, each one of said probability distributions assigning a frequency of occurrence of a predetermined coordinate characteristic in one of said plurality of classes to each one of said plurality of points in said normalized geometric grid;
deriving predetermined coordinate characteristic data for a plurality of second Regions-of-Interest and dimensions for a second addressed object from measurements on the second addressed object;
normalizing each predetermined coordinate characteristic datum for each of the plurality of second Regions-of-Interest with respect to second addressed object dimensions;
obtaining a location in said normalized geometric grid of each of said normalized coordinate characteristic data for each of the plurality of second Regions-of-Interest;
obtaining a frequency of occurrence for each of said predetermined coordinate characteristics, from each of the plurality of second Regions-of-Interest, in each of said plurality of classes at said location;
obtaining a plurality of values, one each of said plurality of values for each of said plurality of classes, from a function of the frequency of occurrence for each one of the characteristic coordinates from each of the plurality of second Regions-of-Interest;
assigning each one of the plurality of second Regions-of-Interest to one of a plurality of classes based on a largest one of said plurality of values from said one of the plurality of second Regions-of-Interest;
recognizing desired items in selected ones of the plurality of second Regions-of-Interest, said selection based on said assignment to a specific class from the plurality of classes of each one of the plurality of second Regions-of-Interest.

20. The method of claim 19 further comprising the steps of:
comparing each one of said plurality of values from each of the plurality of second Regions-of-Interest to a given threshold; and,
abstaining from recognizing desired items in one of the plurality of second Regions-of-Interest if a largest one of said plurality of values, from said one of the plurality of second Regions-of-Interest, in a specific class from the plurality of classes, is less than the given threshold.

21. The method of claim 19 further comprising the steps of incorporating the coordinate characteristic data for each one of the plurality of second Regions-of-Interest, the dimensions for the second addressed object and the assignments of each one of the plurality of second Regions-of-Interest to the plurality of classes into the database.

22. A method for locating address blocks on a digitized image of an addressed object comprising the steps of:
creating a database comprising data from a group of previously analyzed addressed objects, the data corresponding to each one addressed object from said group of previously analyzed addressed objects comprising:
an identifier for each at least one Region-of-Interest included in said one addressed object from said group of first addressed objects, said at least one Region-of-Interest being at least one of a plurality of first Regions-of-Interest,
location data for each said at least one Region-of-Interest,
dimension for said one addressed object,
and, validated previous identification as an address block of each said at least one Region-of-Interest included in said one addressed object;
normalizing each coordinate datum belonging to one of said plurality of first Regions-of-Interest, normalized with respect to dimensions of a corresponding one of said group of previously analyzed addressed objects;
creating a normalized geometric grid normalized to dimensions of an object, said normalized geometric grid comprised of a plurality of points;
forming a plurality of probability distributions, based on the identification as address blocks of each of said plurality of first Regions-of-Interest, each one of said probability distributions assigning a frequency of occurrence of a predetermined coordinate characteristic of an address block to each one of said plurality of points in said normalized geometric grid;
identifying a candidate Region-of-Interest on the digitized image of an addressed object being analyzed; deriving predetermined coordinate characteristic data for the candidate Regions-of-Interest and dimensions for the addressed object being analyzed from said digital image;
normalizing each predetermined coordinate characteristic datum for the candidate Region-of-Interest with respect to dimensions of the addressed object being analyzed;
obtaining a location in said normalized geometric grid of each said normalized predetermined coordinate characteristic datum for the candidate Region-of-Interest, constituting a plurality of locations, each one of said plurality of locations corresponding to one predetermined coordinate characteristic;
obtaining a frequency of occurrence as a predetermined coordinate characteristic of an address block, at each one of said plurality of locations, for said corresponding coordinate characteristic;
obtaining a value from a function of the frequency of occurrence as a predetermined coordinate characteristic of an address block of each one of the coordinate characteristics;
comparing said value to a given threshold; and
selecting, if the value was greater than the given threshold, the candidate Region-of-Interest as an address block.

23. The method of claim 22 further comprising the steps of:
verifying the selection as an address block of the candidate Region-of-Interest;
incorporating, upon positive verification, location data for the candidate Region-of-Interest and the dimensions of the addressed object being analyzed into the database.

* * * * *

UNITED STATES PATENT AND TRADEMARK OFFICE
CERTIFICATE OF CORRECTION

PATENT NO. : 7,058,240 B2
APPLICATION NO. : 10/274028
DATED : June 6, 2006
INVENTOR(S) : Lawrence E. Albertelli et al.

It is certified that error appears in the above-identified patent and that said Letters Patent is hereby corrected as shown below:

Claim 7, column 12, line 20, after the word "value" insert the word --to--

Claim 17, column 15, line 59, the parenthetical mark should be deleted

Claim 22, column 18, line 4, begin a new paragraph with the word "deriving"

Signed and Sealed this

Twenty-first Day of November, 2006

JON W. DUDAS
*Director of the United States Patent and Trademark Office*